C. P. CARROLL.
DISPENSING AND MEASURING APPARATUS.
APPLICATION FILED MAR. 19, 1913.
1,084,927.
Patented Jan. 20, 1914.
2 SHEETS—SHEET 1.
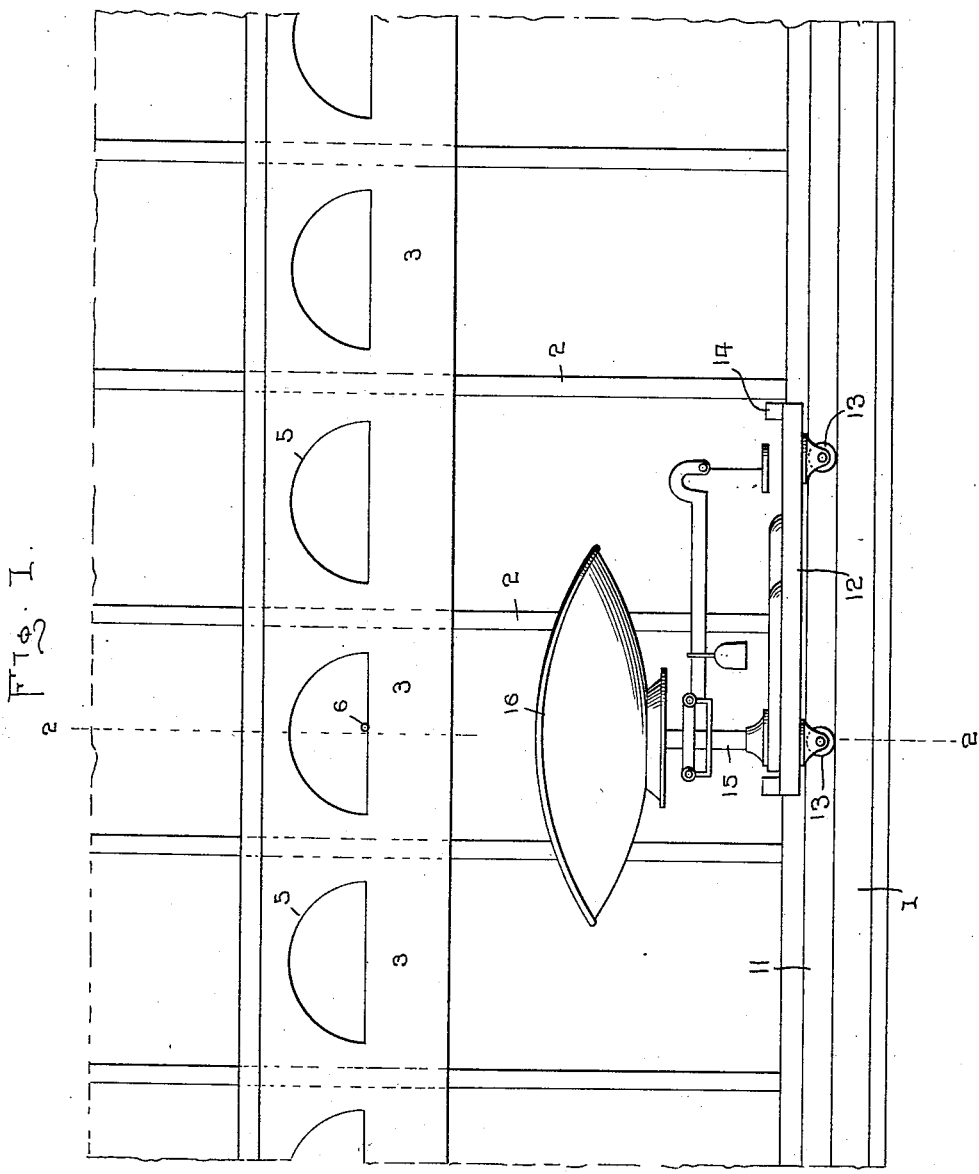
Witnesses
Inventor
C. P. Carroll
By W. J. FitzGerald
Attorney

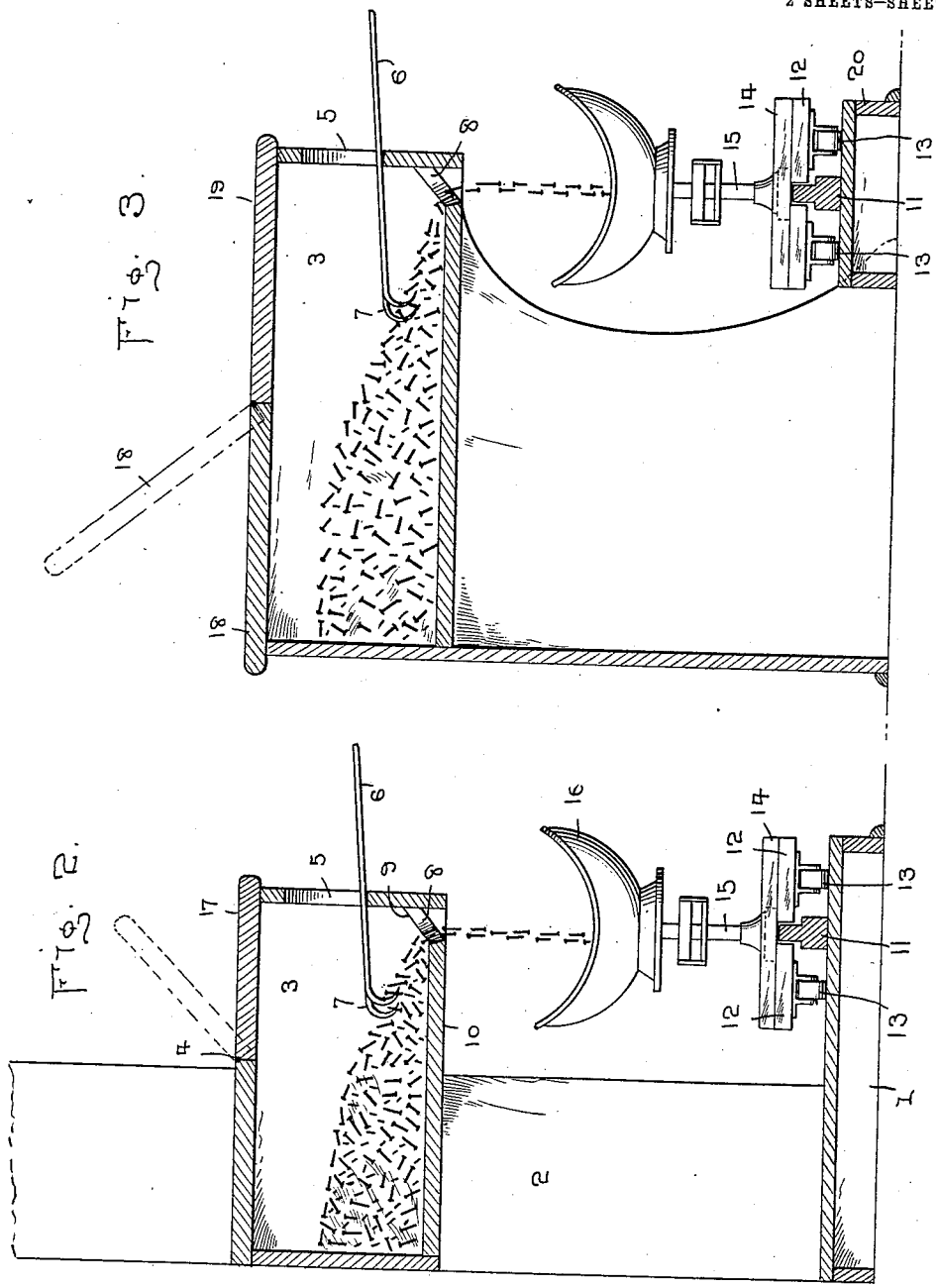

UNITED STATES PATENT OFFICE.

CORNELIUS P. CARROLL, OF COLUMBIA, LOUISIANA.

DISPENSING AND MEASURING APPARATUS.

1,084,927.  Specification of Letters Patent.  Patented Jan. 20, 1914.

Application filed March 19, 1913. Serial No. 755,366.

*To all whom it may concern:*

Be it known that I, CORNELIUS P. CARROLL, a citizen of the United States, residing at Columbia, in the parish of Caldwell and State of Louisiana, have invented certain new and useful Improvements in Dispensing and Measuring Apparatus; and I do hereby declare the following to be a full, clear, and exact description of the invention, such as will enable others skilled in the art to which it appertains to make and use the same.

This invention relates to dispensing and measuring apparatus, and is particularly adapted to dispensing small hardware articles such as nails, washers, and the like, which are sold by weight measure.

The invention has for its object the provision of a storing and dispensing cabinet having a plurality of compartments, each provided with an outlet opening, and a scale device movable to various positions beneath the outlet openings of the compartments.

The invention has for a further object to provide a scale supported over a trackway and movable to various positions beneath a dispensing cabinet for filling the scoop of the scale.

In the accompanying drawings, Figure 1 is a front elevation of a cabinet and movable scale constructed in accordance with my invention. Fig. 2 is a sectional view on the line 2—2 of Fig. 1, and, Fig. 3 is a sectional view of a slightly modified form of the invention.

Referring to the drawings, 1 indicates a platform over which is mounted a plurality of uprights 2, forming partitions between the compartments 3. The walls of the compartments 3 project and are integral therewith outwardly a distance beyond the standards 2, and the tops or projecting portions of said compartments are hinged at 4, so as to provide for the filling of the compartments 3. The front wall of each compartment is provided with an opening 5 through which projects the handle 6 of a claw 7. The contents of the compartments 3 are emptied through an opening 8 in the forward and upwardly inclined portion 9 of the bottom 10, the depending portion of the wall 5 below the upwardly inclined portion 9 of the bottom being adapted to direct the contents of the compartments downwardly. A track 11 is secured to the platform 1 and extends longitudinally of the latter directly below the openings 8 in the compartments 3. Spaced base members 12 movably mounted over wheels 13 are disposed upon opposite sides of the track 11, and are connected by the cross beam 14 which is secured to the upper surfaces of the base bars. A scale 15 is mounted over the base bars 12 and may or may not be secured thereto. The scale 15 is movable to various positions longitudinally of the platform 1 and is guided in its movement by the track 11, as will be understood.

The compartments 3 forming the cabinet may be filled with nails or other small articles of manufacture of different kinds, and dispensed from the compartments by the claw 7, the handle of which projects through the opening 5. When it is desired to weigh a certain amount of any one article, the scale 15 is moved to a position where the removable scoop 16 thereof will catch the material dropped through the opening 8 in the bottom of the compartment. The desired weight of the material to be dispensed is then emptied through the opening 8 with the claw 7.

The projecting portion 17 forming the top of the compartments 3 provides a convenient counter for packaging the articles dispensed from the compartments 3.

In Fig. 3, wherein is disclosed a slight modification of my invention, the cabinet 18 is constructed in the form of a counter having the compartments 3 arranged under the hinged top 19 thereof. As in Figs. 1 and 2, each compartment 3 is provided with openings 5 and 8, under which is built a small platform 20 for supporting the movable scale 15.

While I have here shown two forms of a cabinet which are believed to be desirable, I do not limit myself to the exact construction and arrangement of parts of said cabinet, and further, I contemplate certain variations in the shape and proportion of the parts which will adapt the apparatus to various businesses. It is essential, however, to the successful operation of my invention, that the compartments of the cabinet are disposed above and have their outlet openings arranged on a line representing the path of the scale 15.

What I claim is:—

A bin providing vertical side, front and back walls, a horizontal top, a portion of said top being hinged whereby the bin may be filled with merchandise, a horizontal bottom secured at its rear edge at the lower edge of the rear wall, the front portion of the bottom being inclined upwardly to meet the front wall above the lower edges thereof, said inclined portion having a delivery opening therein, said front wall depending below the inclined bottom and adapted to direct the flow of merchandise downwardly from said opening, said front wall being provided with an opening therein for the reception of a grasping element to guide the merchandise through said delivery opening.

In testimony whereof I have signed my name to this specification in the presence of two subscribing witnesses.

CORNELIUS P. CARROLL.

Witnesses:
R. R. REDDITT,
W. E. GODFREY.

Copies of this patent may be obtained for five cents each, by addressing the "Commissioner of Patents, Washington, D. C."